United States Patent [19]
Wirtz et al.

[11] Patent Number: 4,783,672
[45] Date of Patent: Nov. 8, 1988

[54] METHOD AND APPARATUS FOR CODING PHOTOGRAPHIC MATERIALS

[75] Inventors: John S. Wirtz, Henrietta; David C. Nellis, Victor, both of N.Y.

[73] Assignee: Itek Graphix Corp., Waltham, Mass.

[21] Appl. No.: 105,886

[22] Filed: Oct. 7, 1987

[51] Int. Cl.$^4$ .............................................. G03B 7/24
[52] U.S. Cl. ....................................... 354/21; 354/275
[58] Field of Search .................................. 354/21, 275

[56] References Cited

U.S. PATENT DOCUMENTS 4,248,512 2/1981 Robbins ............................... 354/275

OTHER PUBLICATIONS

1983 Eastman Kodak "Tech Bits", pp. 5-6.

Primary Examiner—Michael L. Gellner
Attorney, Agent, or Firm—Morgan & Finnegan

[57] ABSTRACT

A system for coding photographic materials is provided wherein a code pattern disposed on a cassette containing photosensitive material is read by an optical code reading unit associated with a photographic apparatus adapted to receive the cassette. Preferably, a grey reference patch is provided and the code is a tertiary code defined by black, white and grey printed patches. The type of photosensitive material contained in the cassette is identified from the tertiary code and appropriate exposure and/or development settings can be made by the photographic apparatus. The absence of a recognizable code pattern indicates use of an authorized supply material.

20 Claims, 5 Drawing Sheets

METHOD AND APPARATUS FOR CODING PHOTOGRAPHIC MATERIALS

TECHNICAL FIELD

The present invention relates to optical coding and recognition and, more specifically, to optical coding and recognition of supplies of photographic materials.

BACKGROUND AND OBJECTS OF THE INVENTION

A common problem in the use of any given photographic apparatus is failure by the operator to make proper settings identifying the photosensitive material and/or appropriate exposure and development settings. Since numerous types of photosensitive material, e.g. high contrast paper, continuous tone negative film, plate making material, etc., may be used interchangeably during a single day, this error can cause considerable waste of expensive photosensitive material. Therefore, it would be highly desirable to provide a system for automatically identifying the type of photosensitive material inserted into the photographic apparatus so that appropriate exposure and development settings could automatically be made by the photographic apparatus.

Furthermore, in designing a photographic apparatus such as a camera or phototypesetter it is important to know the specific type or types of photosensitive material that will be used with the apparatus. Indeed, the exposure and development conditions and automatic exposure and development control systems etc. are all designed with the characteristics of the photosensitive material in mind. Conversely, once the apparatus is designed and built it is important that only photosensitive materials having the same characteristics as the material considered in designing the apparatus be used in operating the apparatus. Otherwise, variation in photographic material will evidence itself through inconsistent and, in some cases, unacceptable final results.

Accordingly, at the time of sale the manufacturer of a photographic apparatus often recommends particular photosensitive materials, e.g. authorized films and papers, for use with the apparatus. These may be materials available from the apparatus manufacturer or other authorized sources. However, after purchasing the apparatus the customer may in some instances resort to alternative sources of photosensitive materials without the apparatus manufacturer's knowledge. Unfortunately, the alternative materials may be of lesser quality than the specifically recommended materials. If not of lesser quality, the alternative photographic materials may nonetheless be of less consistent quality than recommended materials or may simply have different characteristics than authorized materials. As a result of these potential differences, the user may experience numerous undesirable results. First, the alternative supply material may not work in the photographic apparatus. Second, the alternative material may give inconsistent results. Third, the user may simply be unable to attain the same high-quality results demonstrated by the apparatus manufacturer prior to or at the time of sale. Fourth, automatic exposure and development settings determined with the authorized photosensitive materials in mind may yield unacceptable or less desirable results with the alternate material.

All of the foregoing possibilities will frustrate the user and cause customer dissatisfaction. As a result, the apparatus manufacturer will often be called in to diagnose and fix a purported problem with the apparatus when the problem lies not in the apparatus but in the user's selection of photographic materials from an unauthorized source. The manufacturer's service representative may inquire whether authorized photographic materials have been used, but with human nature such as it is the customer may be reluctant to admit any transgression in his or her area of responsibility. In some cases the service representative may not ask the appropriate question, particularly where the only materials visible on the customer's premises come from an authorized source. Thus, the manufacturer's representative may unwittingly face a purported machine problem without possessing pertinent facts relating to the cause of the problem. As a result, unnecessary adjustments may be made in an attempt to "fix" the apparatus or the service representative may profess an inability to locate a problem at all. In the latter situation the user will experience frustration and may lodge further complaints. In the former, subsequent service calls will most likely be required to correct the improper or unnecessary adjustments. All in all, these types of events will inevitably damage the apparatus manufacturer's reputation and customer relations.

Therefore, it is one object of the present invention to provide a method and apparatus for recognizing the type of photographic material being used with a photographic apparatus and providing this information to the photographic apparatus so that automatic settings, e.g. exposure and development, can be made.

It is a further object of the present invention to provide a method and apparatus capable of recognizing the type and source of photosensitive supply material being used in a photographic apparatus.

It is a further object of the present invention to provide a method and apparatus for recognizing whether photographic supply materials from an unauthorized source have been used with a photographic apparatus and recording the fact of such use for later service reference.

It is yet a further object of the present invention to provide, in a photographic apparatus, a method and apparatus for recognizing and refusing to accept photographic supply materials from an unauthorized source.

These and other highly desirable and unusual results are accomplished by the present invention in a compact, economical structure which assures proper identification of photosensitive material and appropriate camera settings. In addition, the system according to the present invention assures that only photographic supply materials from authorized sources are used or, alternatively, identifies for future reference the fact that photographic supply materials from an unauthorized source have been used.

Objects and advantages of the invention are set forth in part herein and in part will be obvious herefrom, or may be learned by practice with the invention, the same being realized and attained by means of the instrumentalities and combinations pointed out in the appended claims.

The invention consists of the novel parts, constructions, arrangements combinations, steps, and improvements herein shown and described.

SUMMARY OF THE INVENTION

In accordance with the present invention a photographic materials coding system and method are provided. In accordance with the invention a readable code is provided in association with a photosensitive material supply cassette such that, when the cassette is inserted into the photographic apparatus, a code-reading unit aligns with the code and reads the code to identify the type of photographic material in the cassette and/or determine whether the cassette is from an authorized source.

In the preferred embodiment of the present invention a four element printed code pattern to be read by the code-reading unit includes a grey reference patch and three code-defining patches. The three code patches provide a tertiary code comprised of white, black and grey printed areas. Preferably, the four element printed pattern is printed on the cassette label as part of a larger printed pattern which may be a repeat grid pattern. The grey reference patch and the three code patches may be arranged in a T-Bar configuration. Of course, other shapes and configurations of the code and reference patches are contemplated, as are the use of colored patches other than white, black and grey.

Further in accordance with the preferred embodiment, an optical code-reading unit is provided having a transmitter-sensor corresponding to each element of the tertiary code and the grey reference patch. The transmitter-sensors are configured and dimensioned to correspond to the arrangement of the four printed elements on the cassette so that, when the cassette is properly inserted into the supply bay of the photographic apparatus, one transmitter-sensor is associated with each of the printed patches which define the tertiary code and the grey reference patch. The code-reading unit reads the grey reference patch and standardizes the output of each transmitter corresponding to the code patches in relation thereto. Thereafter, the tertiary code of the three code patches is read and decoded by a custom logic unit to identify the type of photographic material contained in the cassette and/or determine whether the cassette is from an authorized source. Where the cassette is from an authorized source and the type of photosensitive material can be identified, the photographic apparatus may respond by making automatic settings. Where, however, the cassette is from an unauthorized source or does not bear a recognizable code, the photographic apparatus will, at the very least, be unable to make automatic settings. It is also contemplated that the photographic apparatus may be programmed to become disabled and inoperable whenever an unauthorized or unrecognizable cassette is inserted into the photographic apparatus or, alternatively, may simply record for future service reference the fact that an unauthorized cassette has been used with the apparatus.

It will be apparent from the foregoing detaled description that the objects of the invention specfically enumerated herein are accomplished by the invention as here embodied.

Thus, the method and apparatus in accordance with the teachings of the present invention provide a photographic material supply identification system which advantageously enables the photographic apparatus to make automatic settings appropriate for the type of photosensitive material contained in the cassette. As a further advantage, the system according to the invention also facilitates identification of authorized or unauthorized supply cassettes, permitting the photographic apparatus to record for future service reference the use of any unauthorized cassette and/or refuse to operate in conjunction with such a cassette.

It will be understood that the foregoing general description and the following detailed description are exemplary and explanatory of the invention but are not restrictive thereof.

BRIEF DESCRIPTION OF THE DRAWINGS

The accompanying drawings, referred to herein and constituting a part hereof, illustrate preferred embodiments of the product of the present invention, and together with the description serve to explain the principles of the invention, in which.

DETAILED DESCRIPTION OF THE PREFERRED EMBODIMENTS

Figure 1:
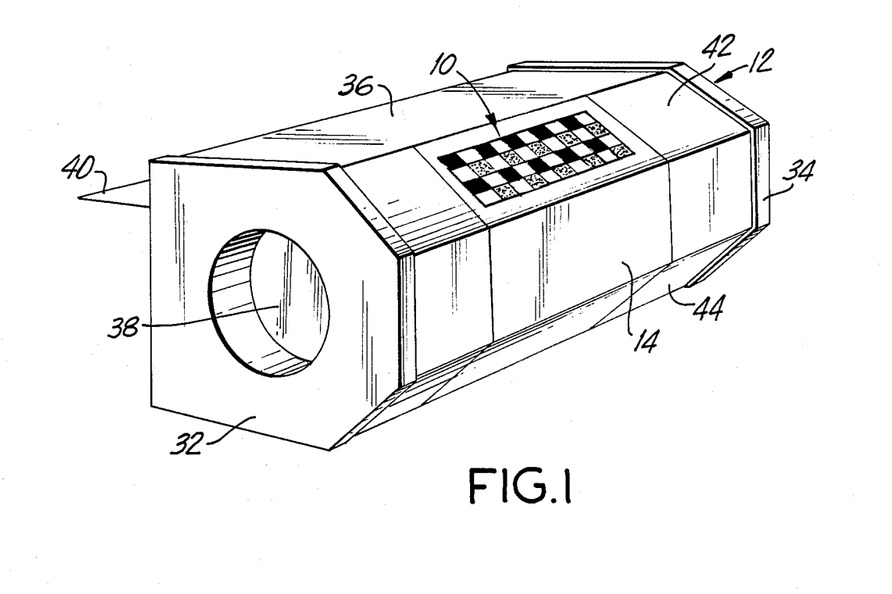
FIG. 1 is a perspective view of a "D" shaped photosesnsitive material supply cartridge bearing a printed pattern including a tertiary code pattern in accordance with the preferred embodiment of the invention.
Figure 2A:
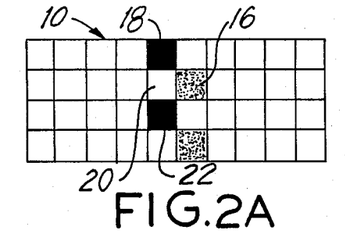
FIGS. 2A through 2G are partial plan views of printed patterns such as shown in FIG. 1, illustrating several variations of the preferred tertiary code patches and grey reference patch in accordance with the invention.

Referring now to the drawings, and, more specifically, to FIG. 1, a printed pattern 10 is shown disposed at a predetermined location on a disposable photosensitive material supply cassette 12. In accordance with the preferred embodiment of the present invention printed pattern 10 is shown in FIG. 1 as a repeat pattern of a four element "T-Bar" code which identifies the photosensitive material within the disposable cassette and is incorporated into the manufacturer's label 14. The T-Bar code is best understood with reference to FIGS. 2A through 2G depicting various code patterns in accordance with the present invention. With reference to FIG. 2A, boxes 16, 18, 20, 22 form a "T" to define the T-Bar code wherein box 16, a grey reference patch, forms the stem of the "T" and boxes 18, 20, 22 define a code identifying the type of photosensitive material contained in the disposable cassette or the source of the cassette. As shown, boxes 18, 20, 22 preferably define a three level or "tertiary" code by providing three distinctly readable densities: white, black and grey. When disposable cassette 12 is correctly positioned in the photographic apparatus, such as a day-light reproduction camera, the code pattern aligns with and is disposed over an oPtical code reading unit (see FIG. 3). The code-reading unit includes four transmitter-sensors 24, 26, 28, 30 (see FIG. 4) to interrogate the four boxes which define the grey reference patch and the code identifying the contents of the disposable cassette. Custom logic circuitry deciphers the code to identify the type of material within the cassette or confirm that the supply cassette is from an authorized source. The photographic apparatus may be programmed not to function with an unauthorized cassette or simply to register in memory the use of an unauthorized cassette for future reference by the apparatus manufacturer s service representative.

Referring to FIG. 1, disposable cassette 12 is shown having what is known as a "D" configuration due to the end view appearance of the cassette looking toward end cap 32. Although only the D shaped cassette is illustrated herein and is preferred due to space saving and positive alignment advantages attributable to this configuration, it should be appreciated that the invention is not limited to use with a D shaped cassette and, in fact, may find application with most any shape of supply cassette. Cassette 12 has end panels 32, 34 and a housing 36 to form a light-tight seal around a roll of photosensitive material disposed on a spool (not shown) which, in turn, is rotatably mounted on end cap spindles 38. A leader 40 of photosensitive material protrudes through a light-tight slot in a known manner.

As shown, a printed pattern 10 is disposed on the cassette at a predetermined location. Pattern 10 is preferably printed as an integral part of adhesive label 14 which may be readily applied to the cassette in registration so that, when the cassette is inserted into the photographic apparatus, a "T-Bar" code at a predetermined location within the printed pattern is properly aligned with a corresponding arrangement of transmitter-sensors 24, 26, 28, 30 mounted as part of a code-reading unit on the photographic apparatus (see FIGS. 3 and 4). Preferably, the printed pattern containing the T-Bar code is disposed on one of the slanted surfaces 42, 44 of the D shaped cassette.

Figure 2B:
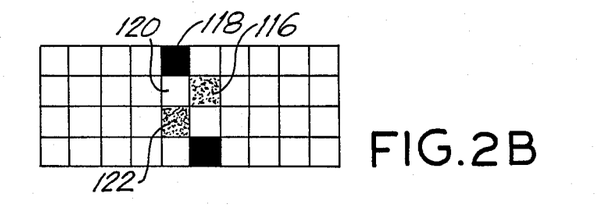
Figure 2C:
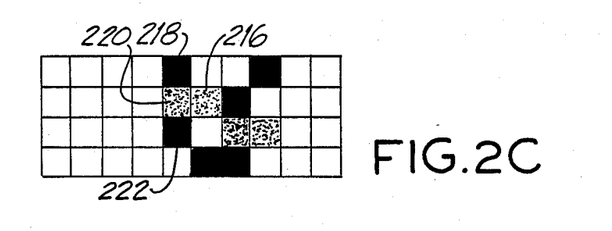
Figure 2D:
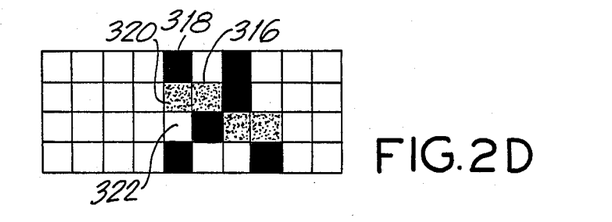
Figure 2E:
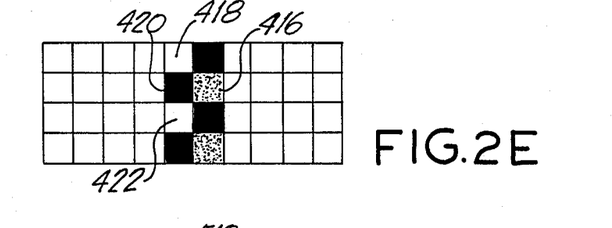
Figure 2F:
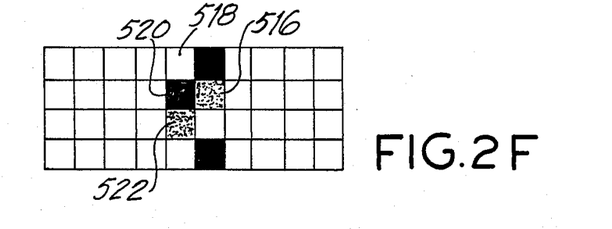
Figure 2G:
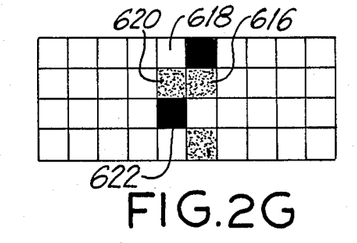

In accordance with the preferred embodiment of the invention the T Bar code consists of four boxes imbedded within the printed pattern 10, as best understood from FIGS. 2A through 2G. With reference to FIG. 2A, boxes 16, 18, 20 and 22 define the T Bar code. Thus, box 16 forms the stem of the "T" which is always shaded as a reference grey patch. The three boxes 18, 20, 22 form the crossbar of the "T" and are shaded black, white or grey to form a three level tertiary code. In this manner twenty seven code permutations are possible. As shown in FIG. 2A, boxes 18, 20, 22 are black, white and black, respectively, to form a code corresponding to one type of photosensitive material, such as plate making material. Referring now to FIG. 2B, box 116 is the grey reference patch and boxes 118, 120, 122 are black, white and grey, respectively, to form a code assigned to another type of photosensitive material, such as high contrast film. In FIG. 2C box 216 is the grey reference patch and boxes 218, 220, 222 are black, grey and black, respectively, to form a code assigned to another type of photosensitive material, such as high contrast paper. In FIG. 2D box 316 is the grey reference patch and boxes 318, 320, 322 are black, grey and white to form a code assigned to another type of photosensitive material, such as reversal material. In FIG. 2E box 416 is the grey reference patch and boxes 418, 420, 422 are white, black and white, respectively, to define a code assigned to another type of photosensitive material, such as negative film. In FIG. 2F box 516 is the grey reference patch and boxes 518, 520, 522 are white, black and grey, respectively, to define a code assigned to another type of photosensitive material such as color film. In FIG. 2G box 616 is the grey reference patch and boxes 618, 620, 622 are white, grey and black, respectively, to define a code assigned to another type of photosensitive material such as continuous tone film or paper.

As shown in FIG. 1, the T Bar code can be imbedded in a repeat printed pattern of the code. FIG. 1 shows a repeat grid pattern of the code shown in FIG. 2A. Of course, the printed pattern 10 need not be a repeat pattern but could be random at points other than the T Bar code. Indeed, the T Bar code could also be printed separate from any larger overall pattern. It is also contemplated that the printed code pattern could be arranged other than as a T configuration or so as to represent or be imbedded within another form of printed matter, such as a logo, so that the code is disguised. This latter result may be advantageous where customers or others are sensitive to packaging appearance.

Figure 3:
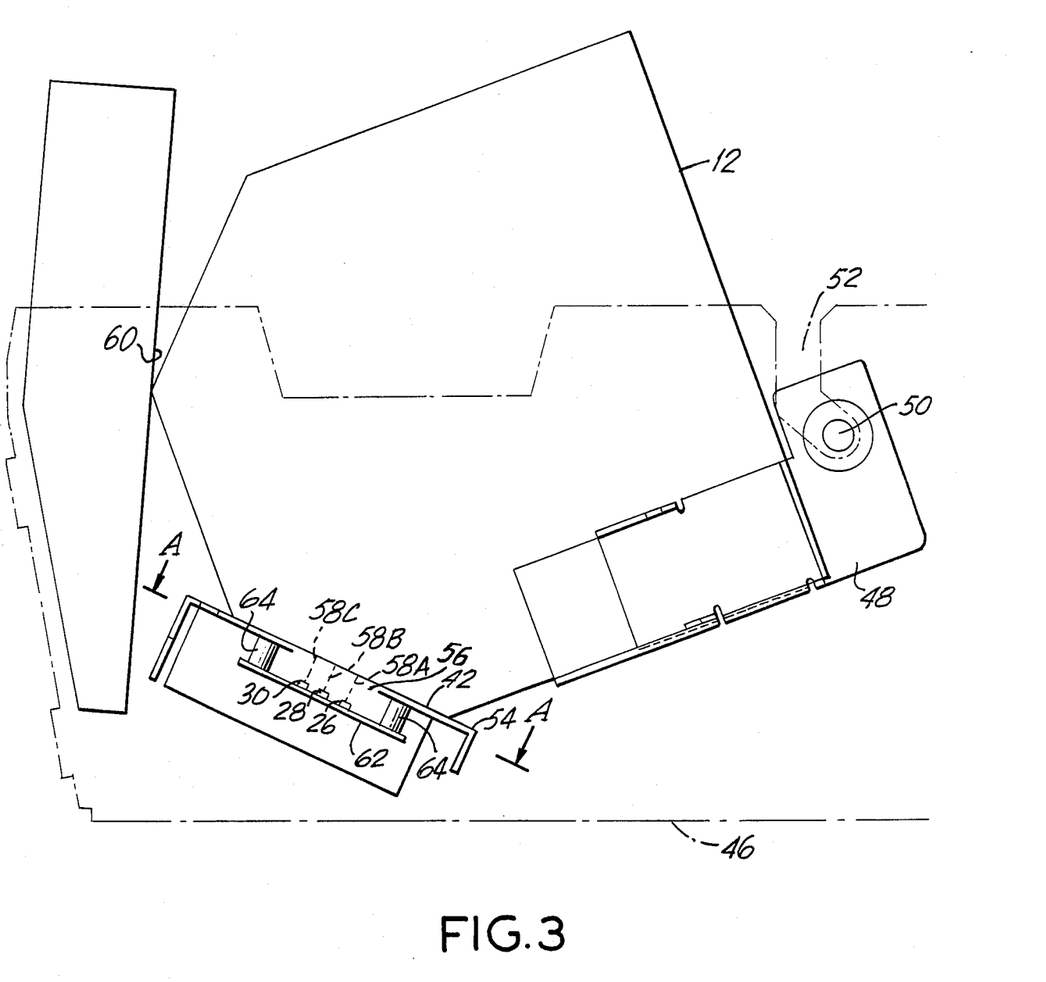
FIG. 3 is a partial cross-section view of the preferred "D" shaped cassette disposed in the supply bay of a photographic apparatus with the code pattern disposed adjacent to an optical code-reading unit.

FIG. 3 is a partial cross-section view of material supply cassette 12 disposed within the supply bay of a photographic apparatus 46 (partially shown). Preferably, supply cassette 12 is couPled to a removable bufferbox 48 having spindles or wheels 50 which engage one or more slots 52 in the photographic apparatus to ensure proper positive positioning of the cassette in conjunction with the photographic apparatus. This ensures that the photosensitive material is properly fed into the photographic apparatus and that the T Bar code is properly aligned over the code reading unit. The principles of operation of a cassette and buffer box 3 are described in U.S. Pat. No. 4,248,512 entitled TWO-PART PHOTOSENSITIVE MEDIA REPLACEABLE CASSETTE SUPPLY DEVICE, which is hereby incorporated by reference. The aforesaid cassette-buffer box arrangement is particularly useful with daylight photographic equipment.

As shown in FIG. 3, slanted side 42 of the cassette bearing the printed code pattern 10 rests against a corresponding cassette support plate 54 which is connected to and supported by the photographic apparatus housing 46. Support plate 54 has an aperture 56 surrounding the T Bar code such that transmitter-sensors 24, 26, 28, 30 (see FIG. 4) are aligned with the four boxes which define the T Bar code along sight lines 58A, 58B, 58C (shown in phantom). The position of cassette 12 within the supply bay of photographic apparatus 46 is assured by the positioning of spindles 50 within slot 52, the slanted surface 42 resting against support plate 54 and/or contact between cassette 12 and supply bay rear surface 60. In this manner the position of the box within the supply bay is known and, as long as the adhesive label bearing printed pattern 10 is applied in registration to cassette 12, proper alignment of the T Bar code relative to the transmitter-sensors will be obtained. It will be noted that the preferred D shaped cassette advantageously conserves sufficient space in the supply bay to accommodate the optical code reading unit.

Figure 4:
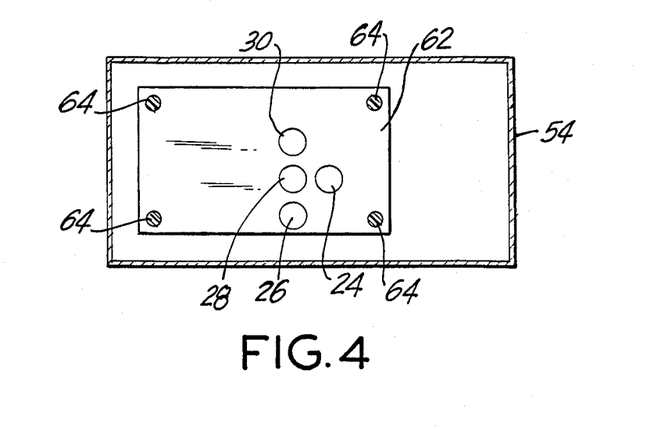
FIG. 4 is a partial cross-section view taken along lines A—A of FIG. 3 illustrating in plan view the transmitter-sensors, of the code-reading unit.

Transmitter-sensors 24, 26, 28, 30 are preferably retroreflective transducers suchas TRW's Optron OPB712. The transmitter-sensors are mounted to a sensor support surface 62 which may be a printed circuit board or other appropriate interconnection device. As shown, sensor support surface 62 is fixed relative to cassette support plate 54 by spaced connectors 64.

FIG. 4 is a partial cross-section view taken along line A—A in FIG. 3 illustrating the transmitter-sensors in plan view. As shown, transmitter-sensors 24, 26, 28, 30 are arranged on sensor supPort surface 62 in a "T" pattern corresponding to the T Bar code on the cassette. Thus, transmitter-sensor 24 corresponds to the grey reference patch of the T Bar code, e.g. box 16 of FIG.

2A, and transmitter sensors 26, 28, 30 correspond to the three boxes, e.g. 18, 20, 22 of FIG. 2A, respectively, which define the tertiary code associated with any given photosensitive material contained within the cassette.

Figure 5:
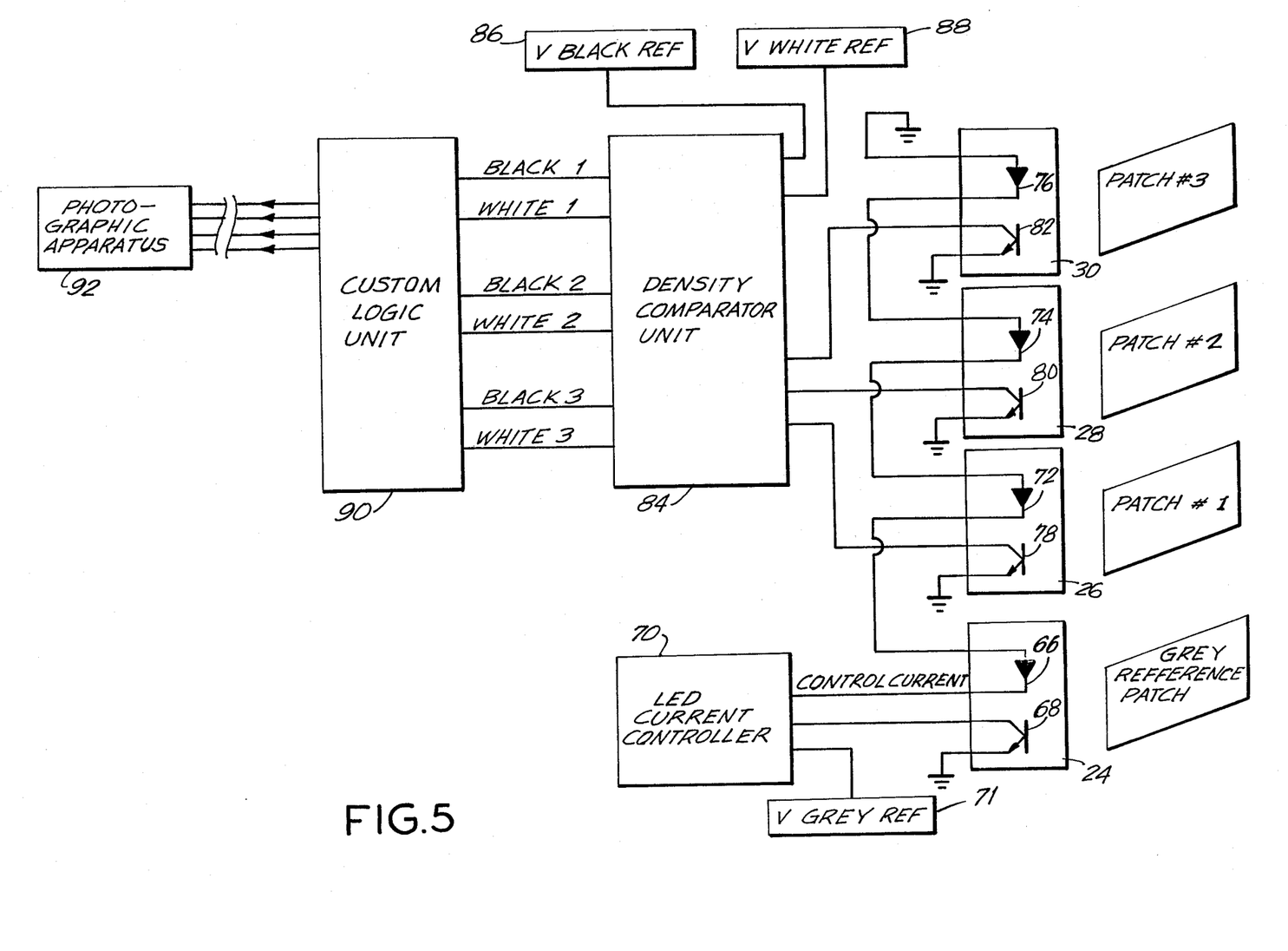
FIG. 5 is a block diagram of the code-reading and logic system in accordance with a preferred embodiment of the present invention.

Referring now to FIG. 5, there is shown a block diagram of the preferred electrical and logic system associated with the present invention. As shown, transmitter-sensor 24 associated with the grey reference patch, e.g. box 16 of FIG. 2A, has a light emitting diode 66 and a photosensor 68 connected to an LED Current Control 70. When reading a code the current controller 70 adjusts the control current to LED 66 until the grey patch return voltage from photosensor 68 is within tolerance of a grey reference voltage 71 ("V GREY REF") sampled by the LED Current Control. Typically, V GREY REF will be approximately one half the system operating voltage and between the expected return voltage for black and white reflectance patch voltages. By way of example, in a 5 volt system V GREY REF might be 2.5 volts and the expected photosensor return voltages for black and white reflectance patches might be 1.5 volts and 3.5 volts respectively.

As shown in FIG. 5, LED 66 is connected in series to LEDs 72, 74, 76 included in transmitter-sensors 26, 28, 30, respectively, so that the control current from LED Current Controller 70 also drives LEDs 72, 74, 76. Each of transmitter-sensors 26, 28, 30 is associated with a different code-defining patch, e.g. boxes 18, 20, 22 of the T-Bar code shown in FIG. 2A. In this manner each diode 72, 74, 76 is driven by the standardized control current to transmit radiation, which may or may not be in the visible spectrum, to be reflected from the corresponding code pattern patch. Radiation from diodes 72, 74, 76 is reflected from patches 1, 2, 3 and detected by each of photosensors 78, 80, 82 included in transmitter-sensors 26, 28, 30 to produce corresponding sensor voltages. The sensor voltage from each photosensor 78, 80, 82 is fed to a density comparator unit 84 which compares each voltage to a black reference voltage 86 ("V BLACK REF") and a white reference voltage 88 ("V WHITE REF") supplied to comparator unit 84 in a known manner in order to determine whether the sensor voltage indicates a black, white or grey patch. By way of example only, in a 5 volt system as previously discussed V BLACK REF might be 1.5 volts and V WHITE REF might be 3.5 volts. Thus, where any given sensor voltage is within tolerance of 1.5 volts density comParator unit 84 will produce a signal indicating that the corresponding code patch is black. Should the sensor voltage be within tolerance of 3.5 volts the comparator unit will produce a signal indicating that the corresponding code patch is white. Where the sensor voltage is not equal to either V BLACK REF or V WHITE REF density comparator unit 84 will produce neither a black or white signal, i.e. a null condition, which is indicative of a grey patch. A black, white or null signal for each code patch is conveyed from the density comparator to a custom logic unit 90. The custom logic unit recognizes black and white signals from the density comparator unit or, where no black or white signal is received, assumes a grey patch has been detected. The custom logic unit is pre-programmed to encode the tertiary black, white, grey code into a four bit digital code.

In the preferred embodiment of the present invention the custom logic unit is programmed to indicate a "fault" whenever all patches are indicated to be the same, i.e. where all patches are indicated to be black, white or grey. In this manner code pattern printing errors, smudges, or non-code mono-color surfaces placed in front of the transmitter-sensors will not trigger a false determination that any particular type of photosensitive supply cassette has been inserted into the photographic apparatus. Since any given fault condition requires only one four bit code the number of tertiary code permutations required to identify numerous types of photosensitive material can readily be accommodated by a four bit code.

The four bit code from custom logic unit 90 is fed to the photographic apparatus, such as a daylight camera, indicated at block 92. The photographic apparatus is programmed in a known manner, such as by reference to a look-up table, to recognize the four bit code and associate the code with pre-programmed identification of the type of photosensitive material in the cassette. Having made this association, the photographic apparatus may automatically set relevant parameters, e.g. exposure or development, based upon pre-programmed values associated with the type of photosensitive material in the cassette.

Although the foregoing discussion has focussed on use of the present code system to identify the type of photosensitive material contained within the cassette, the present system is also particularly useful to ensure that only supply materials from authorized sources are used. For example, since only authorized sources of supply materials are privy to the code key, an unrecognizable or non-existent code can be equated with use of an unauthorized cassette. Under these circumstances the photographic apparatus may be programmed to refuse to operate or, alternatively, to record the use of an unauthorized material for future service reference.

Of course, a variety of modifications to the present photographic materials coding system are contemplated and will readily be appreciated by a person of ordinary skill in the art from the present disclosure or from practice with the invention, all within the scope of the accompanying claims. By way of example only, it is contemplated that the code pattern need not be configured as a T Bar and need not be printed in a grid pattern. Nor does the printed pattern have to be repetitive or, indeed, contain any printed matter other than the code itself. Of course, the code need not be a block grid but could be dots or a portion of some sort of message information, e.g. printed letters or logos on a label. It is further contemplated that other colors besides white, black and grey could be used to formulate the code, although accompanying quality assurance problems such as consistent color reproduction and the spectral response of instrumentation must be considered. It is also contemplated that other or different recognition systems could be used. Indeed, additional circuitry could be provided to expand code capacity or to positively identify the sensor return voltage for a grey patch by comparison to V GREY REF and provide a "grey" signal to the custom logic unit rather than merely by having the custom logic unit assume that a null signal, i.e. no white or black signal, indicates a grey patch. Of course, more than a four bit code from the custom logic unit to the photographic apparatus could also be used.

In use, the operator of a photographic apparatus selects a cassette from inventory based upon the type of photosensitive material contained therein, attaches the cassette to a buffer box and inserts the two-part cassette and buffer box into the supply bay of the photographic apparatus. Advantageously, the preferred D shaped cassette and pre-ordained coupling arrangement between the cassette and buffer box ensures that the cassette can only be operationally disposed within the supply bay in one position wherein the code pattern is disposed adjacent to the transmitter-sensors.

After the cassette is loaded into the supply bay the optical code reading apparatus is activated, either manually by the operator or automatically such as by a microswitch tripped by the presence of the cassette. In the preferred code reader embodiment the LED Current Controller 70 drives LED 66 associated with the grey reference patch until the sensor voltage from transistor-sensor 68 matches V GREY REF. Since the LEDs 72, 74, 76 are driven in series with the grey reference LED 66 all of the LEDs are calibrated as the LED Control Current is adjusted. Of course, if a control current cannot be obtained whereby the sensor voltage from transistor 68 equals V GREY REF then a system failure should be indicated since either a circuit element has failed or the printed code is misaligned or otherwise out of specification.

Where the system is in proper order radiation reflected from the three patches defining the tertiary code activates transistorized sensors 78, 80, 82 which, in turn, produce corresponding sensor voltages that are transmitted to the density comparator unit 84. The density comparator unit compares each sensor voltage with the black and white reference voltages and transmits a black signal, white signal or no signal (indicating a grey patch) to custom logic unit 90. Custom logic unit 90 converts the black, white, grey information for each code patch into a four bit code which, for example, tells the photographic apparatus what type of Photographic material is contained in the cassette so that appropriate settings, e.g. exposure, etc., can automatically be made. Where an unauthorized cassette not bearing a recognizable code is used the photographic apparatus will, at the very least, be unable to make automatic settings. If so programmed the apparatus may become inoperable or may simply record the use of an unauthorized cassette cassette for future reference.

To the extent not already indicated, it will be understood by those of ordinary skill in the art that any one of the various specific embodiments herein described and illustrated may be further modified to incorporate features shown in other of the specific embodiments, as desired.

The invention in its broader aspects therefore is not limited to the specific embodiments herein shown and described but departures may be made therefrom within the scope of the accompanying claims, without departing from the principles of the invention and without sacrificing its chief advantages.

What is claimed is:

1. A n apparatus for coding photosensitive material comprising:
   an optical code pattern disposed on a cassette containing a supply of photosensitive material, said code pattern defining a tertiary code;
   an optical code reading unit associated with a photographic apparatus adapted to receive said cassette, said code reading unit reading said code pattern when said cassette is inserted into said photographic apparatus to determine the type of photosensitive material contained in said cassette.

2. The apparatus according to claim 1 wherein said code pattern includes three printed code patches.

3. The apparatus according to claim 2 wherein said printed code patches are black, white or grey.

4. The apparatus according to claim 3 wherein said code pattern further includes a grey reference patch.

5. The apparatus according to claim 4 wherein said optical code reading unit includes at least one transmitter-sesnsor corresponding to each of said grey reference patch and said code patches.

6. The apparatus according to claim 5 wherein said optical code reading unit reads said grey reference patch and standardizes each transmitter associated with said code patches in response to the grey reference patch reading, whereafter each said code patch is read and the tertiary code defined thereby is decoded to identify the type of photosensitive matreial contained in the cassette.

7. The apparatus according to claim 6 wherein the type of photosensitive material is identified with reference to a look-up table.

8. The apparatus according to claim 7 wherein said photographic apparatus automatically sets exposure parameters appropriate for the type of photosensitive material identified by the code-reading unit.

9. The apparatus according to claim 8 wherein said photographic apparatus records in memory the absence of a code pattern or the presence of an unrecognizable code on any cassette inserted into said photographic apparatus.

10. An apparatus for coding photosensitive materials comprising:
    an optical code pattern disposed on a cassette containing a supply of photosensitive material, said code pattern defining a tertiary code;
    an optical code reading unit associate with a photographic apparatus adapted to receive said cassette, said code reading unit reading said code pattern when said cassette inserted into said photographic apparatus to determine whether said cassette is from an authorized source.

11. The apparatus according to claim 10 wherein said code pattern includes three printed code patches.

12. The apparatus according to claim 11 wherein said photographic apparatus records for future reference the use of a cassette from an unauthorized source in the absence of an authorized code.

13. The apparatus according to claim 11 wherein said photographic apparatus becomes inoperable in the absence of a recognizable code.

14. A method of coding photosensitive materials comprising the steps of:
    providing an optical tertiary code pattern on a cassestte containing photosensitive material;
    reading said code pattern with an optical code reading unit;
    determining, from said code pattern, the type of photosensitive material contained in the cassette.

15. The method according to claim 14 further comprising the step of:
    automatically setting exposure, parameters on a photographic apparatus associated with said optical code reading unit based upon the determination of the type of photosensitive material contained in the cassette.

16. The method according to claim 14 wherein said tertiary code pattern is defined by black, white and grey patches.

17. The method according to claim 16 wherein said code pattern further includes a grey reference patch.

18. The method according to claim 17 wherein said optical code reading unit includes at least one transmitter-sensor corresponding to each of said grey reference patch and said code patches.

19. The method according to claim 18 further comprising the following steps performed prior to said reading step:

optically reading said grey refernce patch; and standarizing each transmitter corresponding to said code patches based upon the reading of said grey reference patch.

20. The method according to claim 15 further comprising the step of:

automatically setting development parameters on said photographic apparatus based upon the determination of the type of photosensitive material contained in the cassette.

* * * * *